United States Patent [19]
Nishio et al.

[11] Patent Number: 4,933,308
[45] Date of Patent: Jun. 12, 1990

[54] HIGH STRENGTH HIGH TOUGHNESS $TiB_2$ CERAMICS

[75] Inventors: Hiroaki Nishio; Shiro Torizuka, both of Tokyo, Japan

[73] Assignee: NKK Corporation, Tokyo, Japan

[21] Appl. No.: 369,884

[22] Filed: Jun. 22, 1989

[30] Foreign Application Priority Data

Jun. 22, 1988 [JP] Japan ................................ 63-152378

[51] Int. Cl.$^5$ ........................ C04B 35/56; C04B 35/58
[52] U.S. Cl. ........................................ 501/92; 501/88; 501/89; 501/87; 501/91; 501/96
[58] Field of Search ........................ 501/96, 92, 87, 91, 501/88, 89

[56] References Cited

U.S. PATENT DOCUMENTS 4,555,358 11/1985 Matsushita et al. ..................... 501/89
4,762,810 8/1988 Endo et al. ............................ 501/88
4,837,231 6/1989 Endo et al. ............................ 501/91

Primary Examiner—William R. Dixon, Jr.
Assistant Examiner—Miriam Sohn
Attorney, Agent, or Firm—Sughrue, Mion, Zinn, Macpeak & Seas

[57] ABSTRACT

A ceramic sintered body comprising $TiB_2$ as the principal component, 0.5 to 30 wt. % of SiC and 2 to 40 wt. % of $ZrO_2$. In some cases $ZrO_2$ includes stabilizers for tetragonal crystal, such as $Y_2O_3$, MgO or $CeO_2$. The sintered body has a dense structure where $TiB_2$, $ZrO_2$ and SiC uniformly disperse. $ZrO_2$ is located at the grain boundary of $TiB_2$, and inhibits the grain growth of $TiB_2$ as well as improves the strength of the sintered body by binding it to $TiB_2$ strongly. SiC is located not only at the grain boundary but also on the inside of both grains. Since the contract of SiC during cooling process of the sintered body is less than $TiB_2$ and $ZrO_2$, compressive stress is produced in SiC and around thereof. The sintered body is remarkably strengthened by the residual compressive stress, and simultaneously, the high fracture toughness is also achieved.

9 Claims, No Drawings

HIGH STRENGTH HIGH TOUGHNESS TiB$_2$ CERAMICS

BACKGROUND OF THE INVENTION

1. Field of the Invention

TiB$_2$ ceramics are hard ceramics, and utilized for cutting tools, plastic working tools, high wear resistance parts and the like. The present invention relates to novel TiB$_2$ ceramics where the strength and the fracture toughness are improved.

2. Description of the Prior Art

TiB$_2$ has various characteristics, such as a high melting point, a high hardness and a high wear resistance. Moreover, it is excellent in high temperature corrosion resistance, and is electrically conductive. Therefore, TiB$_2$ can be processed by electric discharge machining. However, TiB$_2$ is inferior in flexural strength which is 20 to 30 kgf/mm$^2$ and in fragile. Thus, various investigations have been conducted in order to improve the strength of TiB$_2$, and, for example, Japanese Patent No. 1,096,092 discloses improving the flexural strength and fragility by adding nickel boride, cobalt boride, iron boride or the like as binder. Japanese Patent KOKOKU No. 59-7688 discloses improving the strength as well as oxidation resistance and heat resistance by adding a zirconium oxide such as ZrO$_2$, ZrO, ZrO$_{0.35}$ or Zr$_3$O$_{1-x}$ to TiB$_2$. Japanese Patent KOKOKU No. 58-57393 discloses that a composite ceramic sintered material having high density, high strength and which is excellent in oxidation resistance is obtained by adding 10 to 60 wt. % of TiB$_2$ to TiN. Austrian Patent Official Gazette No. 199,886 discloses that composite sintered body of TiC and TiB has high hardness, wear resistance, corrosion resistance and the like.

However, the highest flexural strength of the above sintered bodies is only 110 kgf/mm$^2$, and the fracture toughness is insufficient. Thus, it has been desired to develop a TiB$_2$ having a greater strength and fracture toughness in order that TiB$_2$ can be widely utilized as materials for various uses.

SUMMARY OF THE INVENTION

An object of the invention is to provide a TiB$_2$ ceramic sintered body having high strength and high fracture toughness while retaining the excellent qualities of TiB$_2$ such as high hardness, high wear resistance and high temperature corrosion resistance.

The inventors have performed studies in order to achieve such an object, and found that the above TiB$_2$ ceramic sintered body can be obtained by combining SiC and ZrO$_2$ with TiB$_2$. Thus, the present invention provides a high strength, high fracture toughness TiB$_2$ ceramic sintered body comprising TiB$_2$ as the principal component, 0.5 to 30 wt. % of SiC and 2 to 40 wt. % of ZrO$_2$.

DETAILED DESCRIPTION OF THE INVENTION

The raw powder of TiB$_2$ preferably has low impurities, and a suitable TiB$_2$ has a purity of more than 99 wt. %. The particle size is preferably fine, and not more than 3 μm, particularly not more than 1 μm, as mean particle size, is preferred. The content of TiB$_2$ in the sintered body must be high, and a suitable content is about 40 to 97.5 wt. %, preferably about 60 to 94 wt. %.

The raw powder of SiC preferably has low impurities, and a suitable SiC has a purity of more than 99 wt. %. The particle size is preferably fine, and not more than 3 μm, preferably not more than 1 μm, as mean particle size is preferred. The content of SiC in the sintered body is about 0.5 to 30 wt. %, and about 1 to 10 wt. % is preferred. When the content of SiC is beyond 30 wt. %, decreases in hardness and strength are problems, while, when the content is less than 0.5 wt. %, the blending effect is insufficient.

The raw powder of ZrO$_2$ preferably has low impurities, and a suitable ZrO$_2$ has a purity of more than 99 wt. %, except additives optionally added. The particle size is preferably fine, and not more than 3 μm, preferably not more than 1 μm, as mean particle size is preferred. The raw powder of ZrO$_2$ may be in the form of a sol. When ZrO$_2$ is stabilized in the form of tetragonal crystals, the sintered body a higher strength. For that purpose, ZrO$_2$ is preferably blended with 1 to 8%, preferably 3 to 7% of Y$_2$O$_3$, 1 to 4% of MgO or 10 to 21% of CeO$_2$, as per cent by weight to ZrO$_2$, as a stabilizer for the tetragonal crystals. Two or more kinds of tetragonal crystal stabilizers may be added. The content of ZrO$_2$ in the sintered body is about 2 to 4 wt. %, and 5 to 30 wt. % is preferred. When a tetragonal cyrstal stabilizer is present, the content includes the weight of the stabilizer. When the content of ZrO$_2$ is beyond 40 wt. %, decreases in hardness and strength are problems, while when the content is less than 2 wt. %, the blending effect is insufficient.

The grain growth of TiB$_2$ can also be inhibited by adding a metal carbide other than SiC, a metal nitride, a carbonitride or a metal boride other than TiB$_2$. Such a component includes TiC, VC, ZrC, NbC, Cr$_3$C$_2$, TaC, TiN, Ti(C,N), TaB$_2$, ZrB$_2$, NbB$_2$, and the like. Two or more kinds of the above compounds may be combined. The content of the above compounds is usually less than 20 wt. %, and 0.5 to 20 wt. %, particularly 3 to 15 wt. %, is more suitable.

As the preparation method of the ceramic sintered body of the invention, first, the above raw powders are uniformly mixed. The mixer is preferably a grinding type, such as a ball mill, capable of grinding the whole mixed powder. When balls of TiB$_2$, SiC or ZrO$_2$ are used, the contamination caused by the abrasion of the balls can be avoided. Subsequently, the mixed powder is formed into a molded body having a theoretical density ratio of more than about 50%. The molded body is placed in a sintering furnace, and sintered at 1600° to 2000° C. under a nonoxidizing atmosphere to produce a dense sintered body. The sintered body is preferably further densified by hot isostatic pressing (HIP). The HIP is preferably conducted at 1450° to 1800° C. at more than 1000 atm in an inert gas such as argon. The molded body may also be sintered by a capsule HIP process where the molded body is sealed with vacuum in a metal or glass capsule and HIP is conducted in a state shielded from outer gases. In this case, a dense sintered body can be obtained by the HIP at 1450° to 1800° C. at 1000 to 2000 atm for 1 to 2 hours.

The sintered body thus obtained has a dense structure where TiB$_2$, ZrO$_2$ and SiC are uniformly dispersed. In particular, ZrO$_2$ is located at the grain boundary of TiB$_2$, and inhibits the grain growth of TiB$_2$. The grain size of the TiB$_2$ is small, i.e., 1 to 3 μm, and the TiB$_2$ grains grow little from the raw powder. SiC is located not only at the grain boundary but also on the inside of both the grains of TiB$_2$ and ZrO$_2$. The three-point flexural strength of the sintered body is not less than 110 kgf/mm$^2$ and is usually in the range of 130 to 160 kgf/mm$^2$. The hardness is about 2000 to 3000 kgf/mm$^2$. The fracture toughness is about 6 to 13 MPam$^{0.5}$, usually not less than 7 Mpam$^{0.5}$.

The growth rate of TiB$_2$ itself is high, and in the case of TiB$_2$ simplex, a dense sintered body is not obtained. In the sintered body of the invention, ZrO$_2$ not only inhibits the grain growth of TiB$_2$ but also improves the strength of the sintered body by binding to TiB$_2$ strongly. The fracture toughness of the sintered body is improved by stress-induced transformation and the residual compressive stress after transformation of ZrO$_2$ itself.

The greatest characteristic of the present sintered body is it contains SiC. The thermal expansion coefficient of SiC is $4\times10^{-6}$/°C. which is smaller than that of TiB$_2$ which is $7\times10^{-6}$/°C. and ZrO$_2$ which is $8\times10^{-6}$/°C. The sintered body contracts during cooling, and only the contraction of SiC is low. Then, compressive stress is produced in the SiC and the TiB$_2$ and the ZrO$_2$ around the SiC, and remains in the sintered body which is remarkably strengthened by the residual compressive stress, and, simultaneously, the high fracture toughness is also achieved. Therefore, as shown in Examples 1 through 24, the strength and the fracture toughness of the sintered body of the invention are much greater than those of Comparative Examples 1 through 8 composed of TiB$_2$ and ZrO$_2$. Moreover, as shown in Comparative Examples 9 through 11, when the SiC content is out of the desired range, the effect of the SiC is low.

The grain growth of TiB$_2$ is also inhibited by adding a metal carbide, a metal nitride, a metal carbonitride, a metal boride such as TiC, VC, ZrC, NbC, Cr$_3$C$_2$, TaC, TiN, Ti(CN), TaB$_2$, ZrB$_2$ or NbB$_2$, and they improve the strength of the sintered body. The metal carbide, metal carbonitride, and metal nitride have an action to improve sintering ability, and the blending thereof is advantageous for the production of a dense sintered body.

The ceramic sintered body of the invention is excellent in strength, hardness and fracture toughness, and it can be used for various uses such as cutting tools, plastic working tools and high wear resistance parts.

EXAMPLES

Example 1

87.5 wt. % of TiB$_2$ powder, 10 wt. % of ZrO$_2$ powder stabilized by adding 3.5 wt. % of Y$_2$O$_3$ (TZ-3.5Y) and 2.5 wt. % of SiC powder were mixed and ground by an attritor using zirconia balls in ethanol as a solvent. The mixed powder was dried by a rotary evaporator and rendered granular by passing through a sieve. The granules were uniaxially pressed and cold isostatically pressed to form a molded body having a density of about 60%. The molded body was placed in a glass capsule, and HIP was conducted at 1600° C. at 2000 atm for 2 hours. The sintered body thus obtained was dense, and the mean particle size of the TiB$_2$ was less than 3 μm. The three components were uniformly dispersed in the sintered body. ZrO$_2$ grains were located around the TiB$_2$, and SiC was located at both the grain boundaries and on the inside the grains of both TiB$_2$ and ZrO$_2$. As shown in Table 1, the sintered body had a three-point flexural strength of 150 kgf/mm$^2$, a Vickers hardness of 2580 kgf/mm$^2$ and a fracture toughnes of 7.0 MPam$^{0.5}$.

Examples 2 through 15

TiB$_2$ powder, ZrO$_2$ powder with no Y$_2$O$_3$, 3.5 wt. % of Y$_2$O$_3$ (TZ-3.5Y), 5.2 wt. % of Y$_2$O$_3$ (TZ-5.2Y) or 7.0 wt. % of Y$_2$O$_3$ (TZ-7.0Y) and SiC powder were mixed and ground in the composition shown in Table 1, and molded, similar to Example 1. Then, glass capsule HIP was conducted under the conditions shown in Table 1. The sintered bodies obtained has a dense fine structure where the three components were uniformly dispersed, similar to Example 1. The properties of the sintered bodies are shown in Table 1.

Examples 16 through 22

TiB$_2$ powder, ZrO$_2$ powder with no Y$_2$O$_3$, 3.5 wt. % of Y$_2$O$_3$ (TZ-3.5Y), 5.2 wt. % of Y$_2$O$_3$ (TZ-5.2Y) or 7.0 wt. % of Y$_2$O$_3$ (TZ-7.0Y) and SiC powder were mixed and ground in the composition shown in Table 1, and subjected to uniaxial pressure and CIP to form a molded body having a density of about 60%, similar to Example 1. The molded body was sintered at 1700° to 1800° C. to obtain a sintered body having a density of 95 to 99%. The sintered body was hot isostatically pressed at 1500° to 1600° C. at 2000 atm for 2 hours to obtain a dense sintered body. The sintered bodies thus obtained had a dense fine structure where the three components were uniformly dispersed, similar to Example 1. The properties of the sintered bodies are shown in Table 1.

Example 23

85 wt. % of TiB$_2$ powder, 10 wt. % of ZrO$_2$ powder which had added 2.8 wt. % of MgO and 5 wt. % of SiC were mixed and ground, and subjected to uniaxial pressure and CIP to form a molded body having a density of about 60%, similar to Example 1. The molded body was treated with glass encapsulation HIP under the conditions shown in Table 1. The sintered body thus obtained was dense, and the three components having a mean particle size of less than 3 μm were uniformly dispersed therein. The properties of the sintered body are shown in Table 1. The sintered body was highly tough, and the toughness was beyond 10 MPam$^{0.5}$.

Example 24

85 wt. % of TiB$_2$ powder, 10 wt. % of ZrO$_2$ powder which had added 15.5 wt. % of CeO$_2$ and 5 wt. % of SiC were mixed and ground, and subjected to uniaxial pressure and CIP to form a molded body having a density of about 60%, similar to Example 1. The molded body was treated with HIP similar to Example 23. The sintered body thus obtained had a dense and uniform fine structure. The toughness was also beyond 10 MPam$^{0.5}$.

Examples 25 through 47

TiB$_2$ powder, ZrO$_2$ powder which had no Y$_2$O$_3$, added 3.5 wt. % of Y$_2$O$_3$ (TZ-3.5Y), 5.2 wt. % of Y$_2$O$_3$ (TZ-5.2Y) or 7.0 wt. % of Y$_2$O$_3$ (TZ-7.0Y), SiC powder and TiC, VC, ZrC, NbC, Cr$_3$C$_2$, TaC, TiN, Ti(CN), TaB$_2$, ZrB$_2$ or NbB$_2$ were mixed with and ground in the composition shown in Table 2, and subjected to uniaxial press and CIP to form a molded body having a density of about 60%, similar to Example 1. The molded body was sintered and hot isostatically pressed with or without a glass capsule under the conditions shown in Table 2. The sintered bodies thus obtained had a dense fine structure where the four or more components were uniformly dispersed. The properties of the sintered bodies are shown in Table 2.

Comparative Examples 1 through 11

$TiB_2$ powder, $ZrO_2$ powder with no $Y_2O_3$ added, 3.5 wt. % of $Y_2O_3$ (TZ-3.5Y), 5.2 wt % of $Y_2O_3$ (TZ-5.2Y) or 7.0 wt. % of $Y_2O_3$ (TZ-7.0Y) and SiC powder were mixed and ground in the composition shown in Table 3, and subjected to uniaxial press and CIP to form a molded body having a density of about 60%, similar to Example 1. The molded body was treated with glass encapsulated HIP or sintering and HIP under the conditions shown in Table 3. The sintered bodies had a dense structure where the three components were uniformly dispersed. Nevertheless, the strength was low compared with Examples of the invention, and was 110 kgf/mm$^2$ at the highest, as shown in Table 3.

TABLE 1

| | Example Composition (wt. %) | Sintering Conditions Temperature (°C.) | HIP Conditions | | Properties of Sintered Body | | |
|---|---|---|---|---|---|---|---|
| | | | Temperature (°C.) | Pressure (atm) | Three-Point Flexural Strength (kgf/mm$^2$) | Hardness (kgf/mm$^2$) | Fracture Toughness (MPam$^{0.5}$) |
| 1 | $TiB_2$-10% (TZ-3.5Y)-2.5% SiC | — | 1600 | 2000 | 150 | 2580 | 7.0 |
| 2 | $TiB_2$-2% (TZ-3.5Y)-2.5% SiC | — | 1600 | 2000 | 130 | 2800 | 6.2 |
| 3 | $TiB_2$-5% (TZ-3.5Y)-2.5% SiC | — | 1600 | 2000 | 133 | 2750 | 6.8 |
| 4 | $TiB_2$-10% (TZ-3.5Y)-2.5% SiC | — | 1600 | 2000 | 152 | 2500 | 7.8 |
| 5 | $TiB_2$-10% (TZ-3.5Y)-2.5% SiC | — | 1600 | 1000 | 146 | 2450 | 7.4 |
| 6 | $TiB_2$-20% (TZ-3.5Y)-2.5% SiC | — | 1600 | 2000 | 135 | 2450 | 7.0 |
| 7 | $TiB_2$-20% (TZ-3.5Y)-2.5% SiC | — | 1600 | 2000 | 155 | 2400 | 8.2 |
| 8 | $TiB_2$-30% (TZ-3.5Y)-2.5% SiC | — | 1500 | 2000 | 138 | 2150 | 9.5 |
| 9 | $TiB_2$-30% (TZ-3.5Y)-2.5% SiC | — | 1500 | 1000 | 135 | 2000 | 9.5 |
| 10 | $TiB_2$-20% (TZ-5.2Y)-2.5% SiC | — | 1600 | 2000 | 135 | 2250 | 8.0 |
| 11 | $TiB_2$-20% (TZ-5.2Y)-2.5% SiC | — | 1600 | 2000 | 133 | 2200 | 7.8 |
| 12 | $TiB_2$-40% (TZ-5.2Y)-2.5% SiC | — | 1600 | 2000 | 130 | 2000 | 9.0 |
| 13 | $TiB_2$-10% (TZ-7.0Y)-2.5% SiC | — | 1600 | 2000 | 140 | 2500 | 7.1 |
| 14 | $TiB_2$-10% $ZrO_2$-2.5% SiC | — | 1500 | 1000 | 139 | 2400 | 7.0 |
| 15 | $TiB_2$-20% $ZrO_2$-5% SiC | — | 1600 | 2000 | 135 | 2250 | 8.8 |
| 16 | $TiB_2$-10% (TZ-3.5Y)-2.5% SiC | 1800 | 1600 | 2000 | 144 | 2450 | 8.2 |
| 17 | $TiB_2$-20% (TZ-3.5Y)-2.5% SiC | 1700 | 1600 | 2000 | 143 | 2400 | 8.8 |
| 18 | $TiB_2$-20% (TZ-5.2Y)-2.5% SiC | 1700 | 1600 | 2000 | 145 | 2350 | 9.0 |
| 19 | $TiB_2$-5% $ZrO_2$-1% SiC | 1700 | 1500 | 2000 | 133 | 2550 | 7.5 |
| 20 | $TiB_2$-10% $ZrO_2$-5% SiC | 1700 | 1500 | 2000 | 139 | 2350 | 7.8 |
| 21 | $TiB_2$-20% $ZrO_2$-10% SiC | 1700 | 1500 | 2000 | 137 | 2200 | 8.4 |
| 22 | $TiB_2$-20% $ZrO_2$-30% SiC | 1700 | 1500 | 2000 | 133 | 2100 | 7.0 |
| 23 | $TiB_2$-10% (TZ-2.8M)-5% SiC | — | 1600 | 2000 | 115 | 2300 | 11.0 |
| 24 | $TiB_2$-10% (IZ-15C)-5% SiC | — | 1600 | 2000 | 116 | 2300 | 12.5 |

TABLE 2

| | Example Composition (wt. %) | Sintering Conditions Temperature (°C.) | HIP Conditions | | Properties of Sintered Body | | |
|---|---|---|---|---|---|---|---|
| | | | Temperature (°C.) | Pressure (atm) | Three-Point Flexural Strength (kgf/mm$^2$) | Hardness (kgf/mm$^2$) | Fracture Toughness (MPam$^{0.5}$) |
| 25 | $TiB_2$-20% (TZ-3.5Y)-2.5% SiC-20% TiC | 1700 | 1700 | 2000 | 160 | 2450 | 8.0 |
| 26 | $TiB_2$-20% (TZ-3.5Y)-2.5% SiC-2% TiC | 1700 | 1700 | 2000 | 150 | 2450 | 7.8 |
| 27 | $TiB_2$-10% $ZrO_2$-5% SiC-10% TiC | 1650 | 1600 | 2000 | 160 | 2500 | 7.0 |
| 28 | $TiB_2$-40% (TZ-5.2Y)-2.5% SiC-10% TiC | — | 1600 | 2000 | 145 | 2000 | 9.2 |
| 29 | $TiB_2$-20% (TZ-3.5Y)-5% SiC-20% $Cr_3C_2$ | 1700 | 1700 | 2000 | 155 | 2470 | 8.0 |
| 30 | $TiB_2$-10% (TZ-3.5Y)-2.5% SiC-2% VC | 1600 | 1600 | 2000 | 154 | 2450 | 7.0 |
| 31 | $TiB_2$-30% (TZ-5.2Y)-2.5% SiC-10% VC | 1600 | 1600 | 2000 | 150 | 2150 | 9.5 |
| 32 | $TiB_2$-20% (TZ-3.5Y)-5% SiC-5% ZrC | — | 1700 | 2000 | 150 | 2400 | 7.8 |
| 33 | $TiB_2$-20% (TZ-3.5Y)-2.5% SiC-20% ZrC | 1700 | 1700 | 2000 | 154 | 2400 | 8.0 |
| 34 | $TiB_2$-10% (TZ-3.5Y)-2.5% SiC-10% NbC | 1700 | 1600 | 2000 | 150 | 2450 | 7.0 |
| 35 | $TiB_2$-20% (TZ-5.2Y)-2.5% SiC-5% $Cr_3C_2$ | 1600 | 1600 | 2000 | 150 | 2450 | 7.8 |
| 36 | $TiB_2$-40% (TZ-3.5Y)-5% SiC-10% TaC | 1700 | 1600 | 2000 | 135 | 2000 | 9.5 |
| 37 | $TiB_2$-10% $ZrO_2$-2.5% SiC-10% TiN | 1700 | 1600 | 2000 | 160 | 2350 | 7.1 |
| 38 | $TiB_2$-30% (TZ-3.5Y)-10% SiC-20% TiN | — | 1700 | 2000 | 145 | 2300 | 8.8 |
| 39 | $TiB_2$-10% (TZ-3.5Y)-2.5% SiC-20% Ti(CN) | 1600 | 1600 | 2000 | 152 | 2550 | 7.0 |
| 40 | $TiB_2$-20% (TZ-3.5Y)-5% SiC-5% Ti(CN) | 1600 | 1600 | 2000 | 160 | 2450 | 7.8 |
| 41 | $TiB_2$-20% $ZrO_2$-7.5% SiC-10% $TaB_2$ | — | 1600 | 2000 | 148 | 2450 | 8.1 |
| 42 | $TiB_2$-10% (TZ-3.5Y)-2.5% SiC-20% $ZrB_2$ | 1700 | 1700 | 2000 | 157 | 2400 | 7.3 |
| 43 | $TiB_2$-20% (TZ-3.5Y)-5% SiC-5% $ZrB_2$ | 1700 | 1700 | 2000 | 154 | 2200 | 8.0 |
| 44 | $TiB_2$-40% (TZ-5.2Y)-2.5% SiC-3% $NbB_2$ | 1600 | 1600 | 2000 | 138 | 2000 | 9.8 |
| 45 | $TiB_2$-20% (TZ-3.5Y)-2.5% SiC-5% TiC-10% $ZrB_2$ | 1600 | 1600 | 2000 | 150 | 2450 | 7.8 |
| 46 | $TiB_2$-10% (TZ-7.5Y) -5% SiC-5% ZrC-5% $ZrB_2$ | 1700 | 1700 | 2000 | 152 | 2450 | 7.1 |
| 47 | $TiB_2$-20% (TZ-3.5Y) -2.5% SiC-10% $Cr_3C_2$-5% $TaB_2$ | 1700 | 1700 | 2000 | 150 | 2400 | 7.8 |

TABLE 3

|   | Comparative Example Composition (wt. %) | Sintering Conditions Temperature (°C.) | HIP Conditions Temperature (°C.) | HIP Conditions Pressure (atm) | Three-Point Flexural Strength (kgf/mm$^2$) | Hardness (kgf/mm$^2$) | Fracture Toughness (MPam$^{0.5}$) |
|---|---|---|---|---|---|---|---|
| 1 | TiB$_2$-10% ZrO$_2$ | — | 1600 | 2000 | 100 | 2500 | 4.2 |
| 2 | TiB$_2$-20% ZrO$_2$ | — | 1600 | 2000 | 84 | 2300 | 6.5 |
| 3 | TiB$_2$-30% ZrO$_2$ | — | 1600 | 2000 | 65 | 2100 | 7.4 |
| 4 | TiB$_2$-10% (TZ-3.5Y) | — | 1600 | 2000 | 108 | 2600 | 4.0 |
| 5 | TiB$_2$-20% (TZ-3.5Y) | — | 1600 | 2000 | 110 | 2450 | 5.5 |
| 6 | TiB$_2$-30% (TZ-3.5Y) | — | 1600 | 2000 | 100 | 2200 | 6.3 |
| 7 | TiB$_2$-10% (TZ-3.5Y) | 1800 | 1600 | 2000 | 95 | 2300 | 4.0 |
| 8 | TiB$_2$-30% (TZ-3.5Y) | 1700 | 1600 | 2000 | 75 | 2000 | 6.6 |
| 9 | TiB$_2$-30% (TZ-3.5Y)-0.1% SiC | — | 1600 | 2000 | 50 | 2900 | 3.2 |
| 10 | TiB$_2$-20% (TZ-5.2Y)-35% SiC | — | 1600 | 2000 | 95 | 1700 | 6.5 |
| 11 | TiB$_2$-20% (TZ-5.2Y)-0.1% SiC | — | 1600 | 2000 | 105 | 2550 | 4.0 |

TZ-3.5Y ZrO$_2$ added with 3.5% by weight of Y$_2$O$_3$
TZ-5.2Y ZrO$_2$ added with 5.2% by weight of Y$_2$O$_3$
TZ-2.8M ZrO$_2$ added with 2.8% by weight of MgO
TZ-15C ZrO$_2$ added with 15.5% by weight of CeO$_2$

I claim:

1. A ceramic sintered body consisting essentially of 50 to 95.5 wt. % TiB$_2$, 0.5 to 30 wt. % of SiC and 2 to 40 wt. % of ZrO$_2$, the ceramic sintered body having a three-point flexural strength of not less than 110 kgf/mm$^2$.

2. The ceramic sintered body of claim 1 of which the content of SiC is 1 to 10 wt. % and the content of ZrO$_2$ is 5 to 30 wt. %.

3. A ceramic sintered body consisting essentially of TiB$_2$ as the principal component, 0.5 to 30 wt. % of SiC and 2 to 40 wt. % of ZrO$_2$, and at least one of, 1 to 8% of Y$_2$O$_3$, 1 to 4% of MgO and 10 to 21% of CeO$_2$, as per cent by weight to ZrO$_2$.

4. A ceramic sintered body consisting of essentially of TiB$_2$ as the principal component, with an SiC content of 1 to 10 wt. % and ZrO$_2$ content of 5 to 30 wt. %, wherein the ZrO$_2$ contains 3 to 7% of Y$_2$O$_3$ as per cent by weight to ZrO$_2$.

5. A ceramic sintered body consisting essentially of TiB$_2$ as the principal component, 0.5 to 30 wt. % of SiC and 2 to 40 wt. % of ZrO$_2$, which further contains 0.5 to 20 wt. % of one of more compounds selected from the group consisting of metal carbides other than SiC, metal nitrides, metal carbonitrides and metal borides other than TiB$_2$.

6. The ceramic sintered body of claim 5 wherein said one or more compounds are selected from the group consisting of TiC, VC, ZrC, NbC, Cr$_3$C$_2$, TaC, TiN, Ti(CN), TaB$_2$, ZrB$_2$ and NbB$_2$.

7. The ceramic sintered body of claim 5 or claim 6 wherein the ZrO$_2$ contains 1 to 8% of Y$_2$O$_3$, 1 to 4% of MgO and/or 10 to 21% of CeO$_2$, as per cent by weight to ZrO$_2$.

8. The ceramic sintered body of claim 4 which further contains 0.5 to 20 wt. % of one or more compounds selected from the group consisting of metal carbides other than SiC, metal nitrides, metal carbonitrides and metal borides other than TiB$_2$.

9. The ceramic sintered body of claim 8 wherein said one or more compounds are selected from the group consisting of TiC, VC, ZrC, NbC, Cr$_3$C$_2$, TaC, TiN, Ti(CN), TaB$_2$, ZrB$_2$ and NbB$_2$.

* * * * *